US006925197B2

(12) United States Patent
Dimitrova et al.

(10) Patent No.: US 6,925,197 B2
(45) Date of Patent: Aug. 2, 2005

(54) METHOD AND SYSTEM FOR NAME-FACE/VOICE-ROLE ASSOCIATION

(75) Inventors: Nevenka Dimitrova, Yorktown Heights, NY (US); Lalitha Agnihotri, Fishkill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 615 days.

(21) Appl. No.: 10/029,811

(22) Filed: Dec. 27, 2001

(65) Prior Publication Data

US 2003/0123712 A1 Jul. 3, 2003

(51) Int. Cl.[7] ............................................... G06K 9/00
(52) U.S. Cl. ..................... 382/118; 707/6; 707/102; 707/104.1; 704/231; 704/246; 348/61
(58) Field of Search ................. 707/1, 3, 4, 6, 707/100, 102, 104.1; 351/204; 382/100, 118; 704/221, 231, 232, 246; 348/61, 62

(56) References Cited

U.S. PATENT DOCUMENTS

| 6,629,107 B1 | * | 9/2003 | Ouchi et al. | ............. | 707/104.1 |
| 2001/0003214 A1 | | 6/2001 | Shastri et al. | ................ | 725/109 |
| 2002/0022959 A1 | * | 2/2002 | Nakamura et al. | .......... | 704/246 |

FOREIGN PATENT DOCUMENTS

| EP | 0648054 A2 | 4/1995 | .......... | H04N/7/087 |

OTHER PUBLICATIONS www.imdb.com; a website which contains a database of actors/actresses/movies/characters/roles/etc. which a user places a query about any one of these variables to obtain information of other related variables in the database.*
S. Satoh et al., "Name–It: Association of Face and Name in Video", School of Computer Science, Dec. 1996, CMU–CS–96–205, pp.1–17.

S. Satoh et al., "Name–It: Naming and Detecting Faces in News Videos", National Center for Science Information Systems, IEEE Multimedia Jun. 1999, No. 1, pp. 22–35.

R. Hamada et al., "Associating Video with Related Documents", Graduate School of Electrical Engineering, University of Tokyo, ACM Multimedia Conference, Oct. 1999, vol. 2, pp. 12–20.

* cited by examiner

Primary Examiner—Samir Ahmed
Assistant Examiner—Anand Bhatnagar

(57) ABSTRACT

A method for providing name-face/voice-role association includes determining whether a closed captioned text accompanies a video sequence, providing one of text recognition and speech to text conversion to the video sequence to generate a role-name versus actor-name list from the video sequence, extracting face boxes from the video sequence and generating face models, searching a predetermined portion of text for an entry on the role-name versus actor-name list, searching video frames for face models/voice models that correspond to the text searched by using a time code so that the video frames correspond to portions of the text where role-names are detected, assigning an equal level of certainty for each of the face models found, using lip reading to eliminate face models found that pronounce a role-name corresponding to said entry on the role-name versus actor-name list, scanning a remaining portion of text provided and updating a level of certainty for said each of the face models previously found. Once a particular face model/voice model and role-name association has reached a threshold the role-name, actor name, and particular face model/voice model is stored in a database and can be displayed by a user when the threshold for the particular face model has been reached. Thus the user can query information by entry of role-name, actor name, face model, or even words spoken by the role-name as a basis for the association. A system provides hardware and software to perform these functions.

15 Claims, 3 Drawing Sheets

METHOD AND SYSTEM FOR NAME-FACE/VOICE-ROLE ASSOCIATION

BACKGROUND OF THE INVENTION

1. Field of the Invention

The present invention relates to name and face/voice recognition systems. More particularly, the present invention relates to name-face-role association for consumer queries of databases.

2. Description of the Related Art

When we watch television and/or videos, sometimes we will notice a familiar actor whose name we may not be able to recall. Sometimes we can remember the name of the actor from a photo, but we can't recall the name of the character that he/she played in a particular movie. Sometimes, there is a desire to know what other roles a particular actor played, or possibly what are the names of the actors that have played a certain character over the years (for example, what are the names of all of the James Bond actors?)

In the prior art, there is a face-name link by CMU starts with visual features of the face and performs face recognition aided by closed captioning and text detection (superimposed text) if the name is below the face. The CMU system is meant for TV news programs. However, the face-name link falls short of a system accessible by consumers for providing name-face/voice-role association queries.

SUMMARY OF THE INVENTION

According to the present invention, there is a method and system for users to enter while viewing a television program, movie, sporting event, or by actually querying for name-face-role association to be output for further evaluation. There are many options available to a user after receiving the information, with one such option being to select a pay-per-view program, video rental or video download from the information returned by the database in response to the query. Another option would be to receive a video segment of the specific portion of program, movie, sporting event, etc, where a particular phrase has been spoken by a particular person, who may be an actor or athlete, or to provide a list of video segments.

DETAILED DESCRIPTION OF THE INVENTION

It is understood by persons of ordinary skill in the art that the following description, in conjunction with the accompanying drawings, is provided for purposes of illustration, and not limitation. A person of ordinary skill in the art understands that there can be variations in the depicted embodiments, which are within the spirit of the invention and the scope of the appended claims.

Figure 1A:
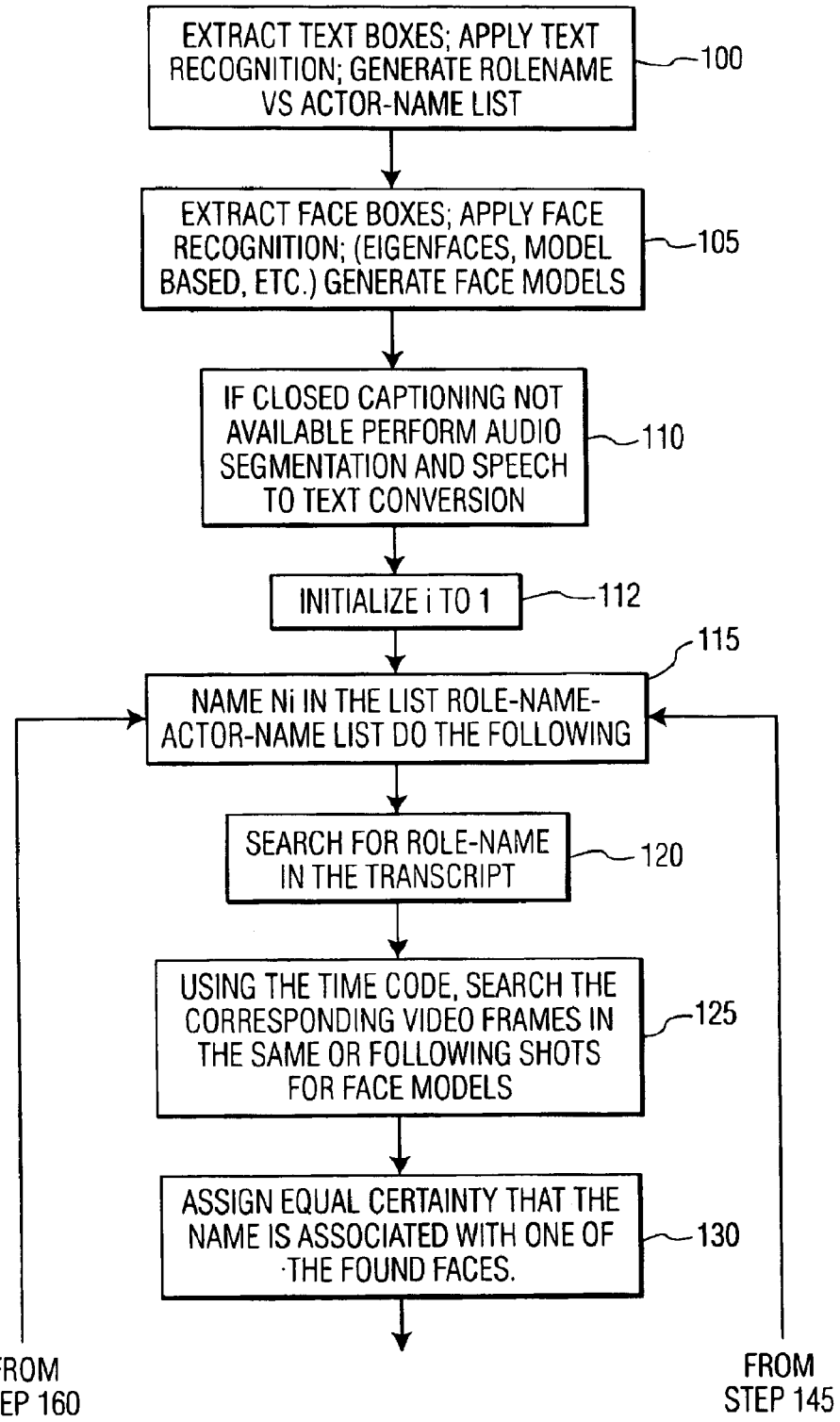
FIGS. 1A and 1B are a flowchart illustrating a name-to-face algorithm according to the present invention.
Figure 1B:
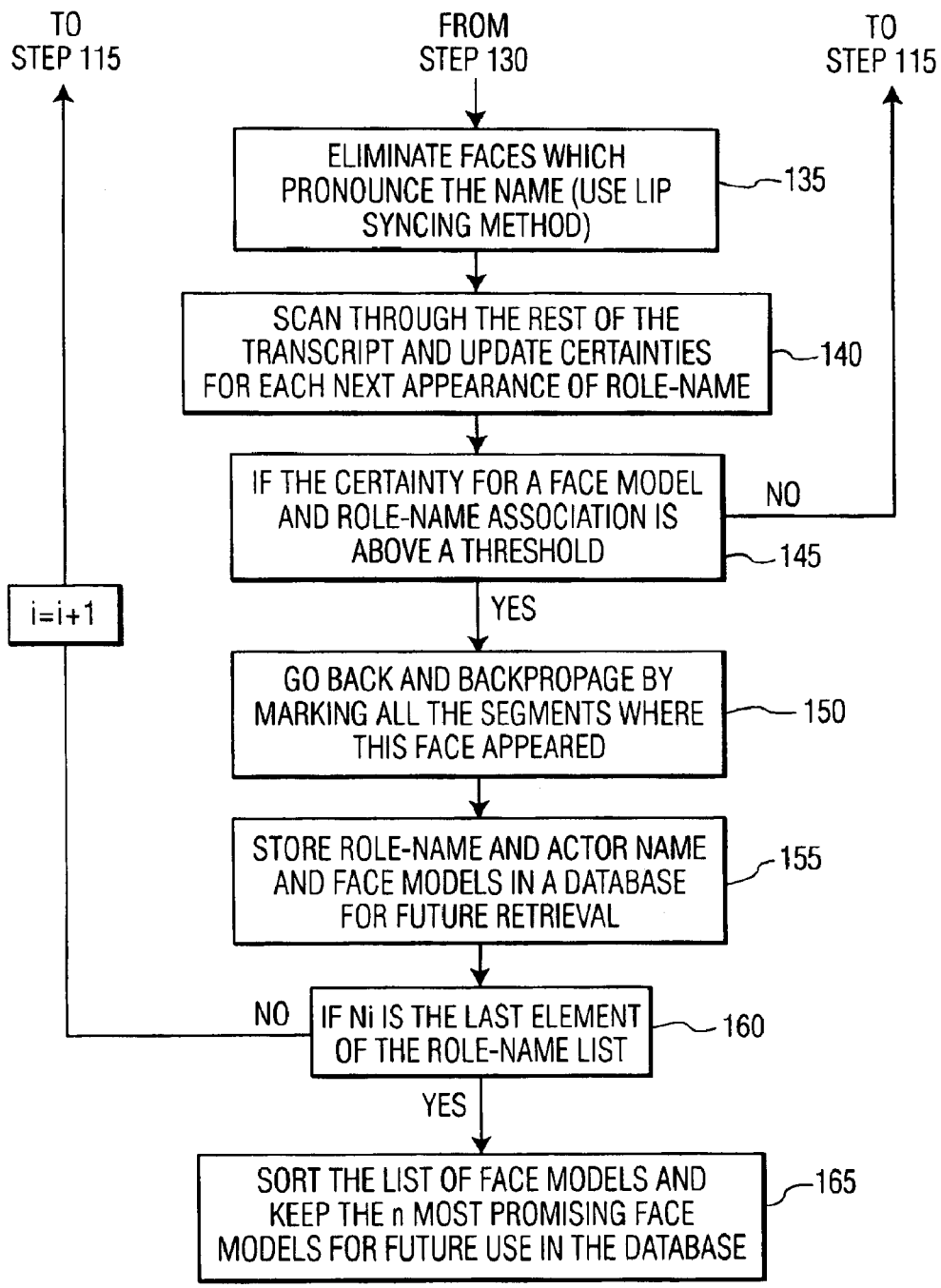

FIGS. 1A and 1B comprise a flowchart illustrating an embodiment of a name-face-role recognition algorithm according to the present invention.

At step 100, there is an extraction of text boxes, followed by the application of text recognition. The extraction of text boxes may be performed a number of ways by using edge information, shape or color region segmentation. A role-name versus actor name list is generated from the recognized text.

At step 105 there is an extraction of face boxes, followed by the application of face recognition to the extracted faces. One possible method to extract face boxes is to use an eigenvector based method for face matching, including but not limited, the MIT Photobook, and the Virage Image system. In addition, model based face extraction is yet another way that the face extraction can be performed. In any of these methods, the result is that face models are generated.

Alternatively, or in addition to the extraction of face boxes, step 105 can include generating voice models by performing voice (speaker) identification using MFCC (Mel cepstral frequency coefficients). Voice identification is also well known in the art. Generating voice models can greatly enhance the experience by the end user because an actor's voice is often his/her trademark. Even in cases where the actor mimics a certain type of speech, the actor's voice can be the most memorable part of a program.

At step 110, audio segmentation and speech to text conversion is formed if the closed captioning is not available. The audio segmentation and speech to text conversion is well known in the art.

At step 112, i is initialized to 1: i=1.

At step 115, the names from the beginning of a program (e.g. from the opening credits) or from the end of a program (from the ending credits) are extracted. Typically, these are main actors who carry the main roles. For example, at the beginning of the show, the names of the actors are often displayed on the screen, often superimposed on their picture, or a video segment. Typically, these names would be stored in a storage area of a database.

At step 120, a search for role-names in the transcript or closed captioning is performed. Closed captioning provides text of the people speaking during a video segment. A list is thus compiled of all the names found. This search is not limited to the role-names of the main actors and could be any recognized name. A first name on the list is referred in this embodiment as Ni.

Then, at step 125, the time code which accompanies the transcript may be used to search the corresponding video frames in the same, or even subsequent frames, for face models/voice models wherever Ni is found in the transcript.

At step 130, a fuzzy logic scheme is used to assign a degree of certainty Ci that one of the face/voices objects found in each of the corresponding video frames in step 125 is associated with the role name Ni. Of course, there are many instances where they may be several faces/voices in a video frame corresponding to or subsequent to a name in the transcript, and the fuzzy logic provides one way to increase the degree of certainty. For each type of confirmation the degree of certainty is increased by a predefined increment. For example, if there is a mention of the name in the transcript the increment for the degree of certainty can be increased can be 0.1, if there is voice identity confirmation, the increase can be 0.2 and face identification can be 0.3.

Thus, the fuzzy logic ideally would initially assign an equal degree of certainty that the name found in the transcript is associated with one of the faces/voices found in the corresponding video frame or subsequent frame or frames.

At step 135, lip reading would be used to increase the degree of certainty by eliminating the face/voice of anyone that says the name identified in the transcript. The reason is that people normally do not say their own name. Of course, there are instances in a show where a person might be asked to say their name, but that would only serve to potentially reduce the degree of certainty, as a person would not normally continue to pronounce their own name again and again.

At step 140, the rest of the transcript is scanned and certainties for each subsequent appearance of a role-name is updated.

At step 145, there is a decision, where it is determined whether the certainty of a face model/voice model with a role-name association Ni is above a predetermined threshold. If the threshold has not been reached, the process goes back to step 115 and the steps up to 145 are performed again until the threshold is reached. It is understood by persons of ordinary skill in the art that with each pass the fuzzy logic will improve the certainty of the face model until that threshold is reached.

At step 150, when the threshold has been reached for face model Ni, there is backpropagating to mark all the segments where the face model appeared for future identification.

At step 155, the role-name and actor name, and the face models/voice models are stored in a database for future retrieval.

At step 160, there is a decision as to whether Ni is the last element of the role-name list generated at step 100. If Ni is not the last element of the list, the process goes back to step 115 to repeat the steps for the next name, $N_{i+1}$. If Ni is the last element of the list, the process continues at step 165.

Finally, at step 165, if there are no more elements on the list, the face models/voice models Ni to $N_{i+n}$ are sorted to keep the models having the highest degree of certainty according to a predetermined threshold in a database. It should be understood by persons of ordinary skill in the art that the items stored in the database as a role appearance data structure, where the role name, duration time in the video segments, pointers to face models/voice models and the degree of certainty of a correlation of the actor name-role name with the face model/voice model is stored. These items may be updated each time the same role is mentioned, and the degree of certainty can be increased or decreased.

Figure 2:
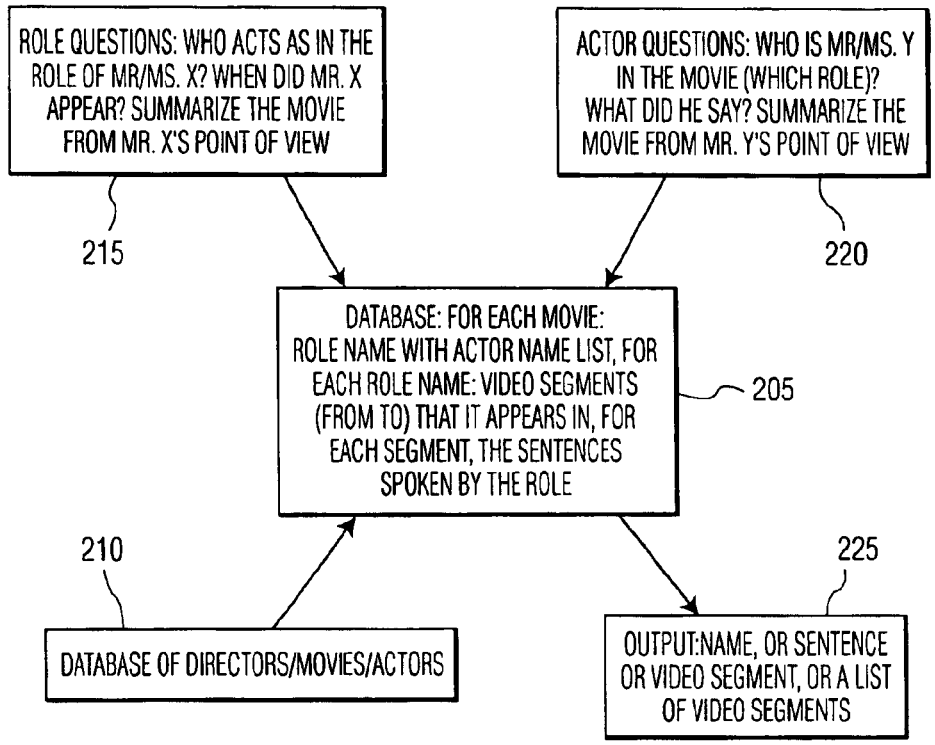
FIG. 2 illustrates examples of query boxes that can be used in a system for name-role-face association for consumer queries according to the present invention.

FIG. 2 illustrates query boxes for a system using name-role-face/voice association for consumer queries according to the present invention. Item 205 represents a database. The database contains, for example, for each movie: a role-name with an actor name list; for each role name, there are the video segments that the role name appears in; for each video segment, there are sentences spoken by the role. This database 205, can be separate from, or in communication with a database 210 of directors/movies/actors. The aforementioned process can create/update the database 205 based on information contained in the database 210.

The consumer queries 215, 220, can be in communication with the database over the Internet, fiber optic network, RF network, LAN, WAN, just to name a few possible forms of communication.

The consumer may present queries in a number of varied ways. For example, if the consumer is interested in the movie Casablanca, he/she may ask who acts in the role of Rick Blaine? The database 205 would be searched and return the name of Humphrey Bogart because of the role-name versus actor name list. As well as provide access to all the movie scenes (segments) with Humphrey Bogart in the role of Rick Blaine. In addition, the consumer could receive a photo of Humphrey Bogart from a face model from the movie. Further, the consumer could receive audio of Humphrey Bogart speaking, or in lieu of a photo, the consumer could receive a video segment with audio of Humphrey Bogart speaking. The video segment could be any format, including, but not by any means limited to, MPEG.

The consumer could also query as to when did Rick Blaine first appear in the movie? In the movie, Rick Blaine is first seen playing chess by himself inside Rick's Cafe, several minutes into the movie. This exact video segment can be retrieved from the database and sent to the consumer. In addition, a summary of the movie from Rick Blaine's point of view could be provided including video segments, combination of snapshots and part of the transcript.

Another example, if the consumer knew that an actor once said in a movie "Here's looking at you kid" there could be a query where the consumer asks who said that phrase, and what movie is it from. The database would then identify that the phrase was said by the role-name Rick Blaine in the movie Casablanca. The actor name of Humphrey Bogart and a face model may be retrieved and provided to the consumer. Alternatively, a segment of Humprhey Bogart saying the phrase "Here's looking at you kid" can be provided.

Additionally, the consumer may query what role that Ingrid Bergman plays in the movie Casablanca. The database would retrieve the role-name of Ilsa Lund. It could be queried as to what she said in the movie. Video segments for each of the times that Ilsa spoke could be retrieved. Alternatively, text and/or audio could be retrieved where she said "Play it Sam. Play 'As Time Goes By.'" In turn, the image and/or voice of Sam, and his actor name Dooley Wilson, may also be retrieved.

Furthermore, a consumer could provide an image of Ingrid Bergman and query as to what is her name and what role-names has she played. The database could then be searched and all of the role-names for all the movies in which Ingrid Bergman was an actor (after recognizing the image), could be displayed. Segments containing her voice could be provided.

Figure 3:
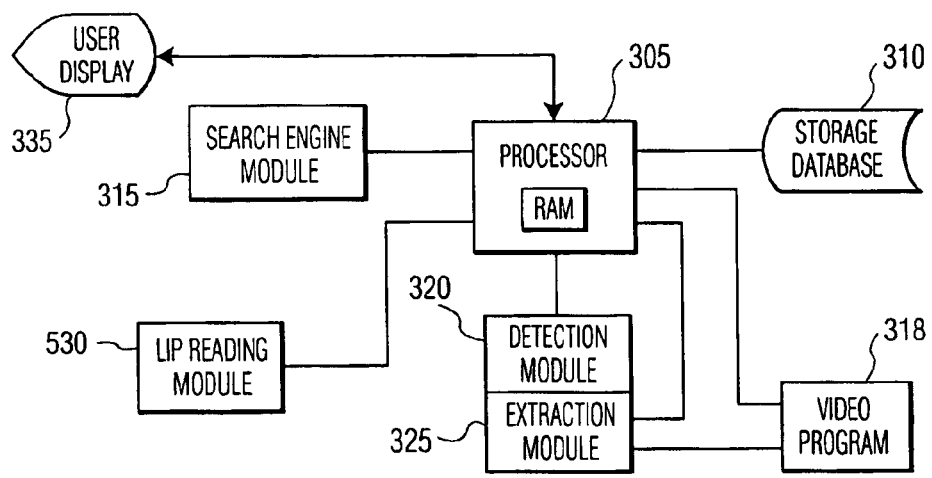
FIG. 3 illustrates one example of the arrangement of a system used for name-face-role association according to the present invention.

FIG. 3 illustrates a system according to the present invention. It is understood by persons of ordinary skill in the art that the layout of the system can be varied from the explanatory example shown. In addition, while the drawings shows lines connecting boxes, the elements of the system can be in wireless (E.g. RF) or fiber optic communication with some or all other portions. The entire system could be contained in a single unit, except for the database, which can be accessible by wire or wireless communication, to name a few possibilities. The system can be Internet based, wherein the processor can be a server and the user communicates with the server via a website, and uses a search engine for query for name-face-role association.

A processor 305 is in communication with a database 310. This database may contain previous name-face-role queries, so that when a user provides, for example, a role name or actor name that has been previously queried, the system may not have to run through the entire process to extraction, detection and lip reading, but may simply call up the result from storage.

The search engine module 315, can be any known in the art. The detection module 320, for detecting closed captioned text, is also known in the art. The extraction module 325, for extracting face boxes and generating face models/voice models, can be any known method, but it is preferred to be an eigenvector based method such as, for example, MIT Photobook and/or Virage Image System be used for face models, and in the case of voice (speaker)

identification, the use of, for example MFCC (Mel frequency ceptral coefficients). The mel-scale is a frequency-binning method which is based on the ear's frequency resolution, because the ear does not perceive sounds linearly across the audio spectrum. By the use of frequency bins on the melscale, mel-cepstral coefficients (MFCC) are computed so as to parameterize speech. The MFCC is a good indicator of the discrimination of the ear. Accordingly, MFCC can be used to compensate distortion channels through implementation of equalization by subtraction in a cepstral domain, as opposed to multiplication in a spectral domain.

Voice identification is also well known in the art. The faces/audio (and the detection of text) would be extracted from a video segment of program 318. This of course, can be in any format compatible with the extraction module. It should be noted that if the detection module 320 does not detect closed captioned text, then a speech-to-text conversion module (not shown) would be required.

The lip reading module 330 would be used for reading lips of the actors to identify whether the actors say the role-name. The more the actor says the role-name, the less likely is that particular actor to be the person playing that role-name, because it is unusual for people to keep repeating their own name.

The user display 335, could be a computer terminal, hand held PALM, Pronto remote control, display of a personal computer, or even a television set. While the system can be Internet based (or other types of networks) portions of the system could be arranged as part of a television display or advanced VCR/DVD player, advanced set-top box, which permits querying capability. It would be preferable for the storage database to be remotely situated because of size constraints and capacity.

It is also envisioned that not only could names, sentences, video segments, or a list of video segments including audio be output, but the consumer would have the option of, for example, purchasing, renting or downloading the movie from which the video segment/segments are provided in response to their query. Accordingly, while the consumer may be using a computer to make the query, an intelligent television system, which permits queries by keying in data, or even voice commands, could be used.

The following is a description of one way that the present invention could be used in a home video. For example, very often family videos are a long (sometimes hours long) compilation of activities. In a home video, there would be roles, such as mom, dad, grandma, grandpa, baby, uncle, aunt, cousin, etc. In this particular case, instead of using transcripts as in the case of movies/programs, a user can assign the above-named roles (as well as many other roles in the video). After the roles are assigned, the voices can be determined, particularly if the assigned roles speak in the segments used to assign the roles. Thus, for example, in a videotape of a family reunion, or wedding, the ability to catalog all of the guests, and later retrieve their image and/or voices wishing congratulations can be accomplished by the presently claimed invention as unknown heretofore.

In another variation, instead of the roles of family members, such as a recorded meeting or a video conference, there could be assignments such as "boss," "the CEO," "notes taker," "client," "sales representative", etc. Alternatively, in a legal teleconference, the judge, plaintiff, defendant, plaintiff's attorney, defendant's attorney, jury, bailiff, and witnesses could also be identified by the presently claimed invention. If the meeting is in a courtroom, the transcript could also be an item used to assist in identification of the parties.

What is claimed is:

1. A method for providing name-face/voice-role association, comprising the steps of:
   (a) determining whether a closed captioned text accompanies a video sequence;
   (b) providing one of text recognition and speech to text conversion to the video sequence to generate a role-name versus actor-name list from the video sequence;
   (c) extracting face boxes/voices from the video sequence and generating face models/voice models;
   (d) searching a predetermined portion of text provided in step (b) for an entry on the role-name versus actor-name list;
   (e) searching video frames for face models/voice models that correspond to the text searched in step (d) by using a time code so that the video frames correspond to portions of the text where role-names are detected;
   (f) assigning an equal level of certainty for each of the face models/voice models found in step (e);
   (g) using lip reading to eliminate face models found in step (e) that pronounce a role-name corresponding to said entry on the role-name versus actor-name list;
   (h) scanning a remaining portion of text provided in step (b) and updating a level of certainty for said each of the face models/voice models found in step (e);
   (i) determining whether a particular face model/voice model and role-name association has reached a threshold;
   (j) storing the role-name, actor name, and particular face model/voice model in a database when the threshold for the particular face model/voice model has been reached.

2. The method according to claim 1, further comprising:
   (k) repeating steps d through j for each entry on the role-name versus actor-name list.

3. The method according to claim 1, wherein step (j) includes
   (i) backpropagating and marking all video segments of the video sequence containing the particular face model/voice model.

4. The method according to claim 1, wherein the extracting of face boxes in step (c) is performed using an eigenvector based method for face matching.

5. The method according to claim 1, wherein the extracting of face boxes is performed by using model-based face extraction.

6. The method according to claim 1, wherein the voice models are determined by using MFCC (Mel frequency cepstral coefficients).

7. A system for providing name-face-role association, comprising:
   a processor;
   storage means for the processor;
   a database which is accessible by the processor;
   means for detecting closed captioned text of a program;
   means for extracting face boxes and generating face models/voice models of the program;
   a search engine used by the processor for searching the program by role-name versus actor-name for a particular role name;
   lip reading detection means for identifying a face model of the particular role-name in the program by eliminating face models which pronounce the particular role name;

communication means for providing a user with the identity of the particular role-name;

means to update the database with the face model/voice model of the particular role-name associated with actor name.

8. The system according to claim 7, further comprising speech-to-text conversion means for use in the absence of closed-captioned text.

9. The system according to claim 7, wherein the processor, means for detecting closed captioned text, means for extracting face boxes, and the search engine are arranged in a network server.

10. The system according to claim 9, wherein the communication means between the user and the system is the Internet.

11. The system according to claim 9, wherein the communication means between the user and the system is one of fiber optic and RF.

12. The system according to claim 11, wherein the particular role-name provided to the user by the communication means is communicated to the user in HTML format.

13. The system according to claim 7, wherein the program in containing the role-name versus actor name is one of broadcast, videotape, videodisc, and videostream.

14. The system according to claim 7, wherein the system comprises a home video system.

15. The system according to claim 7, wherein the system comprises a teleconferencing system.

* * * * *